United States Patent
Gantner et al.

[11] Patent Number: 5,586,739
[45] Date of Patent: Dec. 24, 1996

[54] PIPE CLAMP

[75] Inventors: Gebhard Gantner, Nenzing, Austria; Franz Dengg, Saarbrücken, Germany; Peter Ofner, Feldkirch, Austria; Herbert Münzenberger, Wiesbaden, Germany

[73] Assignee: Hilti Aktiengesellschaft, Schaan, Liechtenstein

[21] Appl. No.: 415,016

[22] Filed: Mar. 31, 1995

[30] Foreign Application Priority Data

Mar. 31, 1994 [DE] Germany .................... 44 11 220.3

[51] Int. Cl.⁶ ............................................ F16L 3/08
[52] U.S. Cl. ................ 248/74.1; 248/65; 248/73; 248/500; 248/505
[58] Field of Search .................. 248/65, 73, 74.1, 248/74.2, 67.7, 500, 505

[56] References Cited

U.S. PATENT DOCUMENTS

| | | | |
|---|---|---|---|
| Re. 28,035 | 6/1974 | Fork | 248/500 |
| 2,303,108 | 11/1942 | Blackburn | 248/73 |
| 3,966,155 | 6/1976 | Meyer | 248/73 |
| 4,059,872 | 11/1977 | Delesandri | 248/74.1 |
| 4,391,376 | 7/1983 | Finnegan | 248/73 |
| 4,709,888 | 12/1987 | Cubit et al. | 248/73 |
| 4,903,933 | 2/1990 | Yuda | 248/500 |
| 5,103,609 | 4/1992 | Thoreson et al. | 52/232 |
| 5,261,633 | 11/1993 | Mastro | 248/74.1 |

FOREIGN PATENT DOCUMENTS 0486299 11/1991 European Pat. Off. .

*Primary Examiner*—Leslie A. Braun
*Assistant Examiner*—Richard M. Smith
*Attorney, Agent, or Firm*—Anderson Kill & Olick P.C.

[57] ABSTRACT

A pipe clamp includes a wall part (1) with at least one bracket (3) located on its outside surface. At least one attachment part (2) is engageable in the bracket (3) and projects laterally outwardly from the wall part.

10 Claims, 3 Drawing Sheets

PIPE CLAMP

BACKGROUND OF THE INVENTION

The present invention is directed to a pipe clamp with a wall part and at least one attachment part projecting radially outwardly in the region of at least one end side of the wall part.

Pipe clamps are known for bulkhead-type sealing of combustible pipes which include a wall part and an attachment part projecting radially in the region of at least one end side of the wall part. Basically, the wall part is made up of two elements in the shape of half-shells pivotally connected to one another.

The attachment part consists of a flange extending radially outwardly in the region of an end side of the wall part extending around the entire circumference of the pipe clamp. The flange has at least one through opening for an attachment element which can be secured to a base structure or foundation, for securing the flange or the entire pipe clamp to the base structure or foundation. The pipe clamp has a fire retardant insert.

Use of this known pipe clamp is impossible with pipes located in corners in the vicinity of walls, ceilings or floors, since the radial projection of the flange does not permit installation of the pipe clamp in the desired position.

SUMMARY OF THE INVENTION

Therefore, the primary object of the present invention is to provide a pipe clamp which can be installed quickly and simply on pipes laid in corners in the vicinity of walls, ceilings or floors.

In accordance with the present invention, an attachment part is arranged to be detachably connected to a wall part of the pipe clamp.

Due to the detachable connection of the attachment part on the wall part, there is the possibility of connecting the pipe clamp including the wall part to the pipe and subsequently fastening the attachment part to the region of the outside circumferential surface of the wall part, so that the attachment part does not come into contact with the walls, ceilings or floors.

The wall part has at its circumferentially extending outside surface at least one bracket projecting outwardly in the radial direction.

Preferably, the inside cross-section of the bracket runs parallel to the central axis of the wall part, so that the pipe clamp at its inside can be fixed to the surface of a base structure or foundation.

To facilitate the fastening of the attachment part to the outer surface of the wall part depending upon the available space, it is advantageous if several brackets are arranged in at least one circumferentially extending row around the outside surface of the wall part.

It is expedient if the brackets are disposed at substantially equal spacings in the circumferential direction for manufacturing and installation reasons. The diagonal of the attachment parts and the arrangement of the attachment parts at equal spacings from one another is thus possible. The retaining force of the attachment parts fastened at the base structure or foundation is distributed equally around the circumference of the wall part.

To enable fitting the attachment part in the inside cross-section of the bracket on the wall part, preferably the attachment part has a hook extending along a line of the wall part whereby it can be introduced into the bracket. In addition to the hook, the attachment part has a clamping surface extending perpendicularly to the opening of the hook and has at least one through opening for receiving a fastening element.

Preferably, the hook is shaped so that it is open towards an end side of the wall part. The spacing between the side of the attachment part abutting the base material and the internal arc segment of the hook corresponds essentially to the spacing between the end side of the wall portion bearing against the surface of the base material and the mouth or entrance into the bracket.

The hook is expediently shaped as a spring clip to afford good retention of the hook in the bracket. The hook of the invention has an opening slightly smaller than the material thickness of the bracket formed in the wall part. When it is slid into the bracket, the hook is slightly widened, whereby it is prestressed and forms a frictionally locked connection with the bracket.

Another possibility for preventing the disengagement of the attachment part from the wall part involves a positively locked connection between the attachment part and the wall part. Preferably this is achieved with a hook having a snap-in element which can be brought into connection with the bracket. Accordingly, the hook has at least one projection in the form of a snap-in element on its inside, whereby the snap-in element can engage in a recess or through opening in the bracket.

Several attachment parts can be used for securing the wall part.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
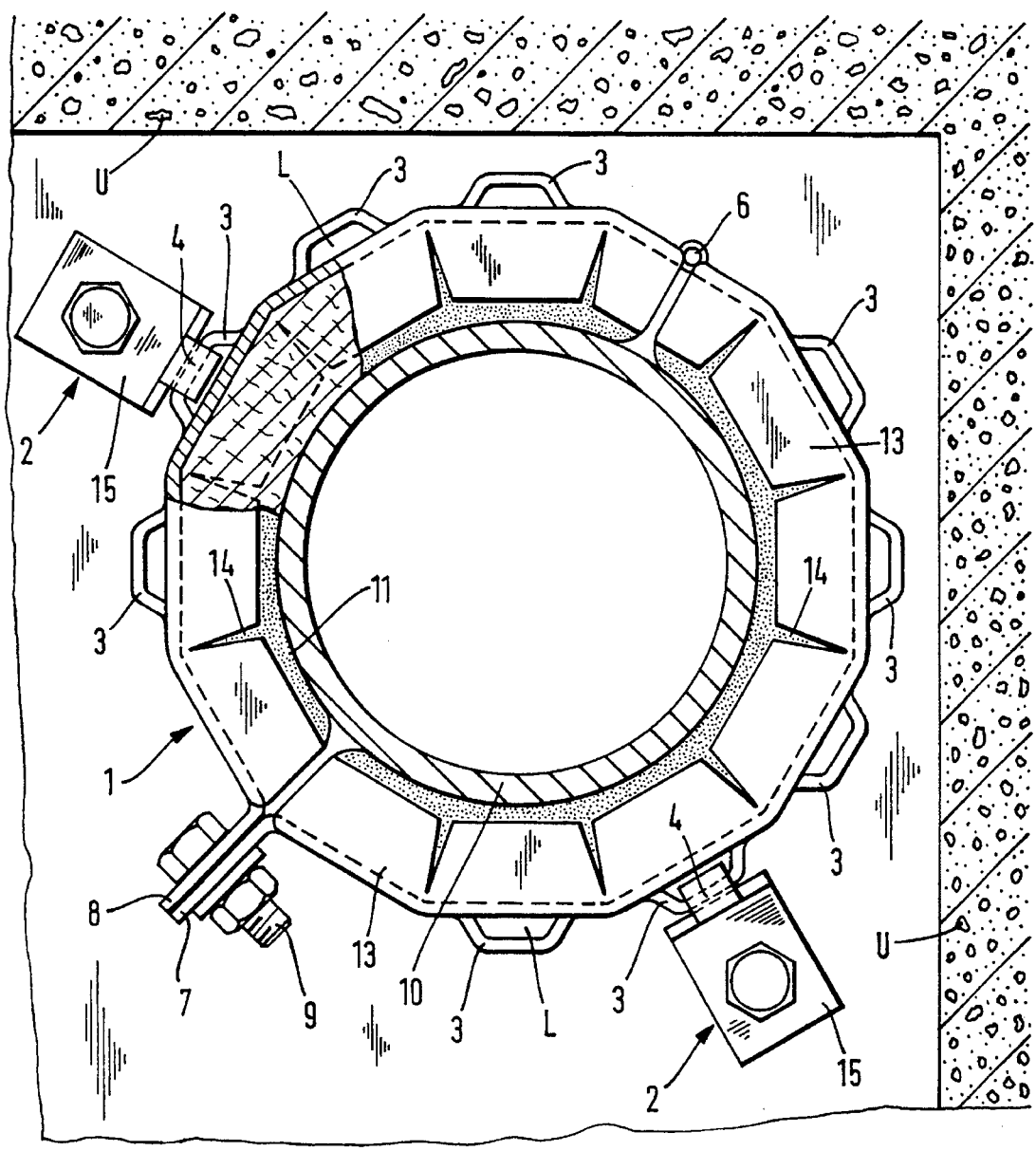
FIG. 1 an end view, partially in section, of a pipe clamp embodying the present invention and shown in the fixed state.

In FIG. 1 a pipe clamp is shown with a circumferentially extending annular wall part 1, formed of two half-shell elements pivoted together around a mutual pivot axis 6. The wall part 1 has a central axis, not illustrated. The opposite ends of the wall part from the pivot axis each have a radially outwardly projecting flange 7, 8 for bolting the half-shell elements into a single unit. The bolting is accomplished by at least one clamping bolt 9 extending through openings in the flanges 7, 8.

Wall part 1 is formed of a metal section bent at several circumferentially spaced locations for forming an essentially circular shape. At the opposite sides of the wall part 1, circumferentially extending end sides 13 are bent radially inwardly towards the central axis of the pipe clamp and have material cutouts 14 for affording the circular shape of the wall part 1. The end sides 13 of the wall part 1 afford the retention and guidance of an insert 11 of a fire retardant material.

About its other surface, the wall part has several radially outwardly projecting brackets 3 substantially equally spaced apart for receiving at least one attachment part 2 for securing the pipe clamp to the surface of a base material or foundation U.

As displayed in FIG. 1, the pipe clamp encloses and holds a pipe 10 laid in a corner of a base structure. The attachment parts 2 cannot be located at just any location around the circumference of the wall part 1. Because of the plurality of brackets 3 located around the circumference of the wall part 1, the attachment parts 2 can be positioned and fastened as closely as possible to the base structure. As shown, the two attachment parts are located as closely as possible in diagonally opposite positions. In securing the wall part 1, several attachment parts can be utilized for fixing the pipe clamp in place.

Figure 2:
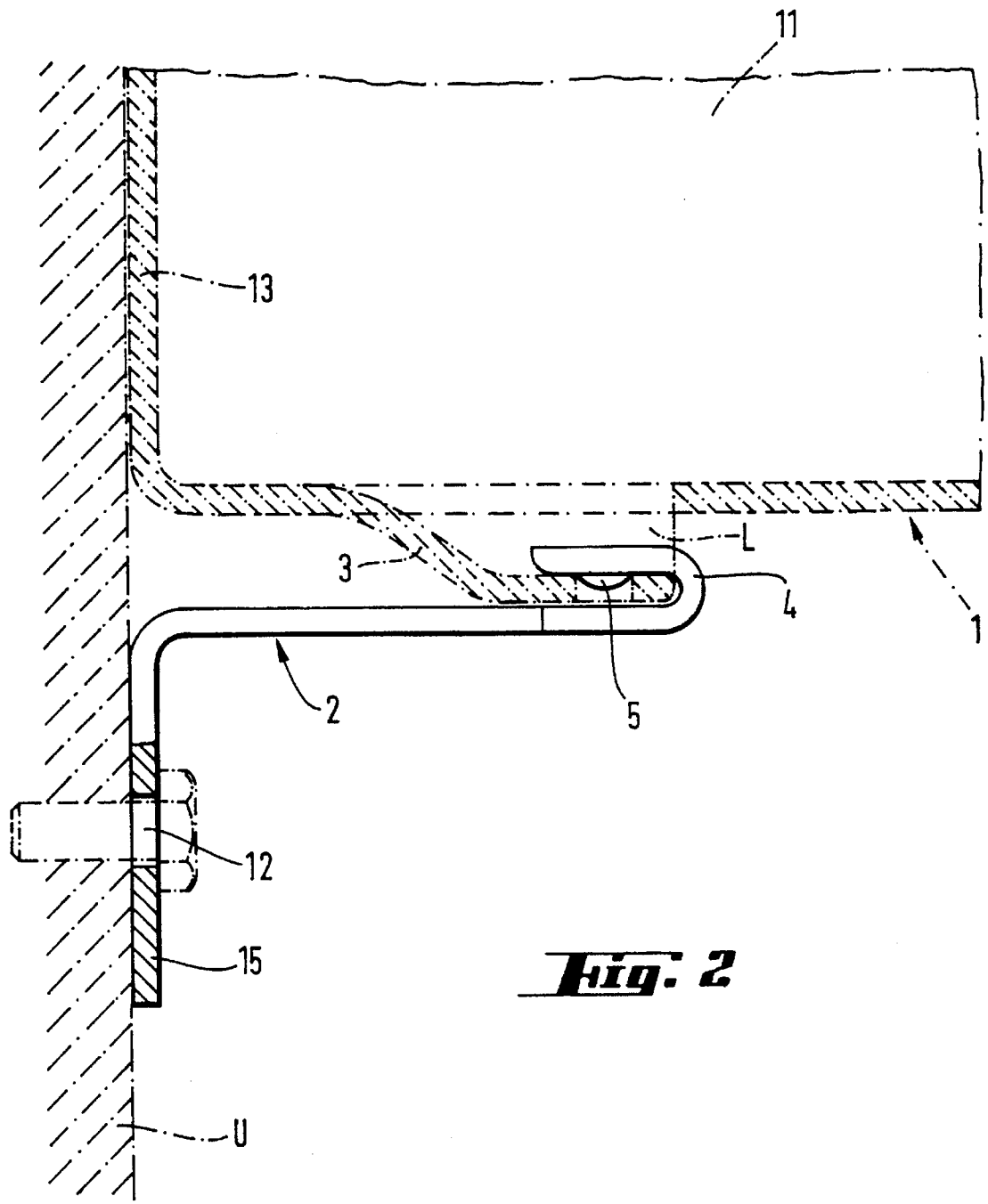
FIG. 2 is an attachment part for securing the pipe clamp shown in FIG. 1, to a base structure.

In FIG. 2 the attachment part is shown in full lines while the pipe clamp is shown in phantom. Attachment part 2 has a hook 4 at one end and a clamping face 15 at the other end extending perpendicularly to the central axis of the pipe clamp. The clamping face 15 has an opening 12. A snap-in element 5 is formed on an inner surface of the hook projecting into the opening within the hook and, as shown, fits into a positively locked connection with a similarly shaped recess or opening in the bracket 3.

To achieve a good anchor of the attachment part to the base structure U, the width of the clamping face 15 is greater than the width of the hook 4 matched to the inside cross-section of the bracket, note FIG. 1.

Figure 3:
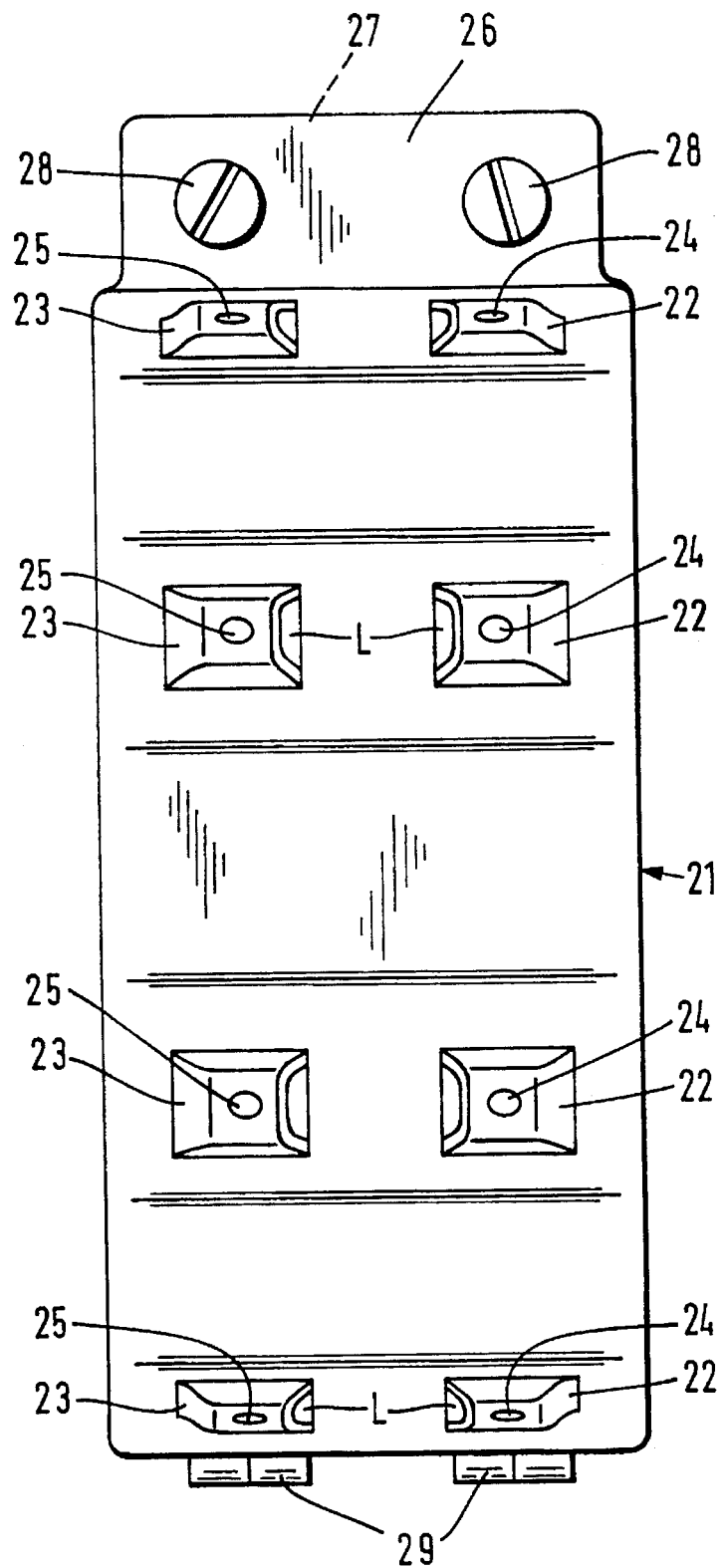
FIG. 3 is an elevational view of another pipe clamp embodying the present invention with two circumferentially extending rows of brackets in the outer surface of the wall part.

In FIG. 3 the pipe clamp includes a wall part 21 also formed of two half-shell elements pivotally connected at a pivot axis 29 with the pivot axis located at one end of each of the half-shell elements and with radially protruding flanges 26, 27 located at the other ends. The flanges 26, 27 are bolted together by bolts 28. Two circumferentially extending rows of brackets 22, 23 are located extending in the circumferential direction around the outside surface of the wall part 21. The openings into the cross-sections or widths L of the brackets 22, 23 face one another, however, they are spaced apart in the axial direction of the pipe clamp to enable the introduction of the hook of an attachment part, not shown, into a bracket. The brackets 22, 23 each have a through opening 24, 25 for affording a positively locked connection with a snap-in element in the hook of the attachment part.

While specific embodiments of the invention have been shown and described in detail to illustrate the inventive principles, it will be understood that the invention may be embodied otherwise without departing from said principles.

We claim:

1. Pipe clamp with an annular wall part (1, 21) having a central axis and a circumferentially extending outside surface, at least one attachment part (2) extending radially outwardly from said outside surface of said wall part (1, 21), wherein the improvement comprising that said attachment part (2) having a radially inner section detachably connected to the outside surface of said wall part (1, 21) and a radially outer section, said wall part (1, 21) comprises at least one bracket (3, 22, 23) projecting radially outwardly from the outside surface thereof, and said attachment part being detachably connected to said bracket, and wherein said bracket forms an opening extending parallel to said central axis and arranged to receive said radially inner section of said attachment part.

2. Pipe clamp, as set forth in claim 1, wherein a plurality of said brackets (3, 22, 23) are disposed in at least one circumferentially extending row on the outside surface of said wall part (1, 21).

3. Pipe clamp, as set forth in claim 2, wherein said brackets (3, 22, 23) are located at equal spacings from one another in the circumferential direction of said wall part (1, 21).

4. Pipe clamp, as set forth in claim 1, wherein said attachment part (2) comprises an elongated section having a hook (4) at one end insertable into said bracket (3, 22, 23) with said hook (4), extending in the axial direction of said wall part (1).

5. Pipe clamp, as set forth in claim 4, wherein said wall part has a radially inwardly directed end side at each of opposite circumferentially extending sides of said wall part extending transversely of the central axis, and said hook (4) having an opening facing towards one of the end sides of said wall part (1, 21).

6. Pipe clamp, as set forth in claim 4, wherein said hook (4) is formed as a spring clip for frictionally engaging said bracket (3, 22, 23).

7. Pipe clamp, as set forth in claim 5, wherein said hook (4) is formed as a spring clip for frictionally engaging said bracket (3, 22, 23).

8. Pipe clamp, as set forth in claim 4, wherein said hook (4) comprises a snap-in element (5) for engagement in an opening extending through a wall in said bracket (3, 22, 23).

9. Pipe clamp, as set forth in claim 5, wherein said hook (4) comprises a snap-in element (5) for engagement in an opening extending through a wall in said bracket (3, 22, 23).

10. Pipe clamp, as set forth in claim 6, wherein said hook (4) comprises a snap-in element (5) for engagement in an opening extending through a wall in said bracket (3, 22, 23).

* * * * *